(12) United States Patent
Nagao

(10) Patent No.: US 11,572,881 B2
(45) Date of Patent: Feb. 7, 2023

(54) COMPRESSOR SYSTEM

(71) Applicant: MITSUBISHI HEAVY INDUSTRIES COMPRESSOR CORPORATION, Tokyo (JP)

(72) Inventor: Hideki Nagao, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 149 days.

(21) Appl. No.: 17/135,042

(22) Filed: Dec. 28, 2020

(65) Prior Publication Data
US 2021/0207607 A1  Jul. 8, 2021

(30) Foreign Application Priority Data

Jan. 6, 2020 (JP) .............................. JP2020-000331

(51) Int. Cl.
*F04D 17/12* (2006.01)
*F04D 29/28* (2006.01)
(Continued)

(52) U.S. Cl.
CPC .......... *F04D 17/122* (2013.01); *F04D 29/284* (2013.01); *F04D 29/056* (2013.01); *F04D 29/4206* (2013.01); *F16C 2360/44* (2013.01)

(58) Field of Classification Search
CPC .... F04D 17/122; F04D 29/042; F04D 29/044; F04D 29/0405; F04D 29/0473; F04D 29/054; F04D 29/056; F04D 29/162; F04D 29/266; F04D 29/384; F04D 29/4206; F16C 2360/44; F16D 1/02; F16D 1/06; F16D 63/10
(Continued)

(56) References Cited

U.S. PATENT DOCUMENTS 3,959,990 A * 6/1976 Golitz .................... H02K 7/116
464/83
5,795,138 A * 8/1998 Gozdawa .............. F04D 29/063
417/423.12
(Continued)

FOREIGN PATENT DOCUMENTS

DE        19819500 C1    3/2000
EP        3121449 A1 *   1/2017   ........... F04D 17/122
(Continued)

*Primary Examiner* — Kenneth J Hansen
(74) *Attorney, Agent, or Firm* — Osha Bergman Watanabe & Burton LLP

(57) ABSTRACT

A compressor system includes a compressor including a rotary shaft, an impeller, and a casing, a motor including a motor rotor disposed coaxially with the rotary shaft, and a coupling shaft coupling the motor rotor to the rotary shaft. The compressor includes a compressor bearing that rotatably supports the rotary shaft, and a compressor connecting hub that is fixed to the rotary shaft at a position where the compressor connecting hub overlaps the compressor bearing in the axial direction and at a position on an inner side in the radial direction. The coupling shaft is allowed to alleviate misalignment with the compressor connecting hub. The compressor bearing rotatably supports an outer peripheral surface of the compressor connecting hub.

9 Claims, 3 Drawing Sheets

(51) Int. Cl.
*F04D 29/056* (2006.01)
*F04D 29/42* (2006.01)

(58) Field of Classification Search
USPC .................. 464/98, 153, 161, 178, 182, 183
See application file for complete search history.

(56) References Cited

U.S. PATENT DOCUMENTS

| | | | |
|---|---|---|---|
| 7,252,474 B2 * | 8/2007 | Belokon | F01D 11/02 |
| | | | 415/173.5 |
| 2007/0082744 A1 * | 4/2007 | Corey | F16D 3/78 |
| | | | 464/99 |
| 2011/0008186 A1 | 1/2011 | Palomba et al. | |
| 2019/0085850 A1 | 3/2019 | Nagao | |

FOREIGN PATENT DOCUMENTS

| | | |
|---|---|---|
| JP | 5986351 B2 | 9/2016 |
| JP | 2019-052600 A | 4/2019 |
| WO | 2017/125344 A1 | 7/2017 |

\* cited by examiner

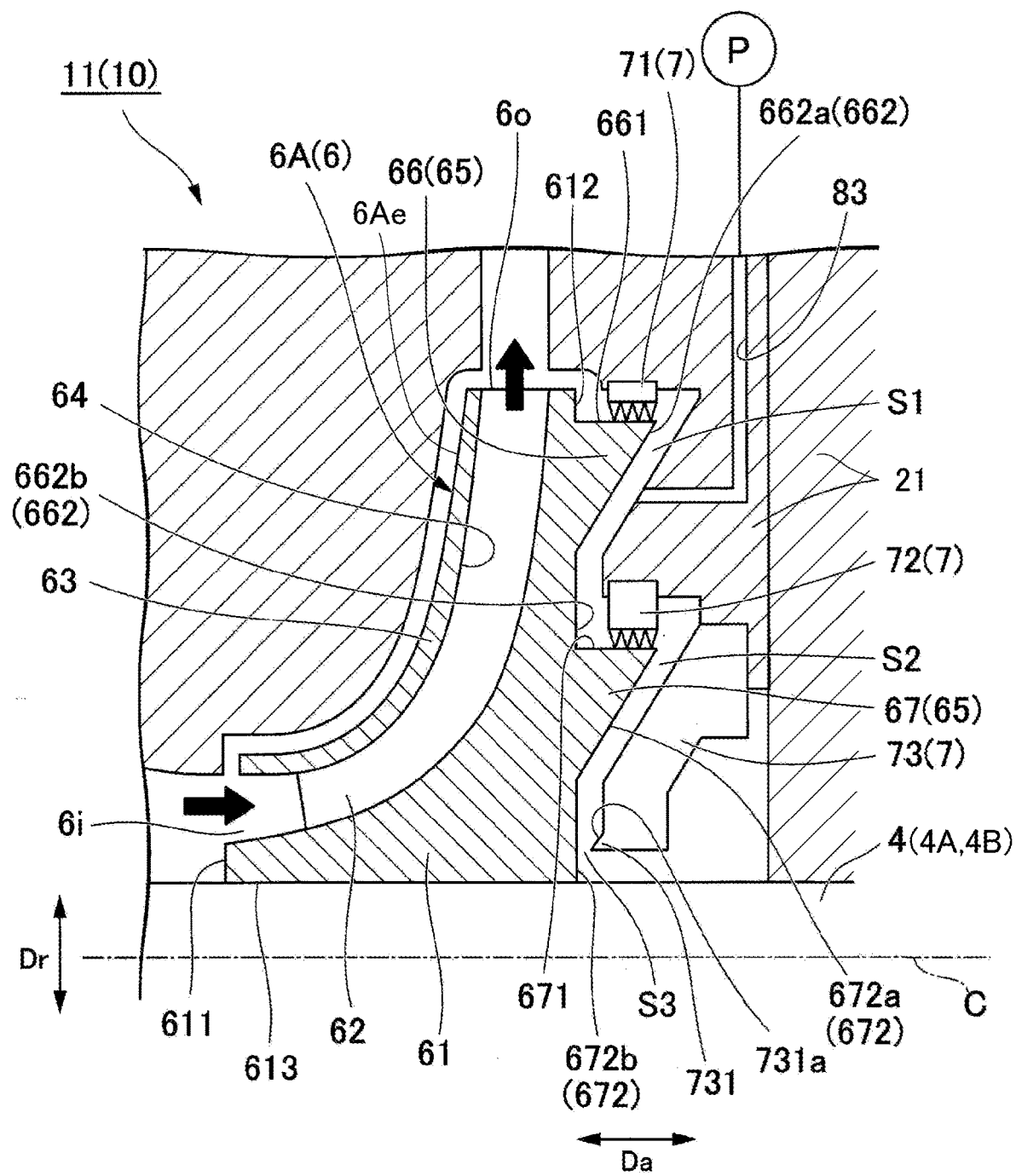

COMPRESSOR SYSTEM

BACKGROUND OF THE INVENTION

Field of the Invention

The present disclosure relates to a compressor system.
Priority is claimed on Japanese Patent Application No. 2020-000331, filed on Jan. 6, 2020, the contents of which are incorporated herein by reference.

Description of Related Art

Generally, centrifugal compressors include a rotary shaft, impellers provided on the rotary shaft, and a casing that covers the impellers from the outside. For example, Japanese Patent No. 5986351 discloses a configuration including a centrifugal compressor (compressing device) and a motor (motor device) that drives the centrifugal compressor. In this configuration, a first rotor (rotary shaft) of the motor and a second rotor of the centrifugal compressor are coaxially and mechanically coupled to each other. The second rotor of the motor and the first rotor of the centrifugal compressor are coupled to each other by a mechanical coupling.

SUMMARY OF THE INVENTION

In the configuration disclosed in Japanese Patent No. 5986351, the mechanical coupling that couples the rotary shafts to each other is disposed at a position that overhangs outward in the axial direction from a bearing that supports the second rotor in the centrifugal compressor. When a heavy object such as the mechanical coupling is provided outside the bearing, the rotor dynamics of the rotary shaft will be adversely affected, which hinders an increase in the rotation speed of the rotary shaft.

The present disclosure provides a compressor system capable of improving rotor dynamics of a rotary shaft and increasing the rotation speed of the rotary shaft.

A compressor system according to the present disclosure includes a compressor including a rotary shaft that is configured to rotate around an axis, an impeller that is configured to rotate with the rotary shaft, and a casing that covers the rotary shaft and the impeller; a motor that includes a motor rotor disposed coaxially with the rotary shaft and a stator disposed outside the motor rotor in a radial direction and is configured to rotationally drive the rotary shaft; and a coupling shaft that couples the motor rotor to the rotary shaft such that the rotation of the motor rotor is transmittable to the rotary shaft, the compressor includes a compressor bearing that supports the rotary shaft to be rotatable around the axis, and a compressor connecting hub that is fixed to the rotary shaft at a position where the compressor connecting hub overlaps the compressor bearing in an axial direction in which the axis extends and at a position on an inner side in the radial direction, the coupling shaft being detachably connected to the compressor connecting hub, the coupling shaft is allowed to alleviate misalignment with the compressor connecting hub, and the compressor bearing rotatably supports an outer peripheral surface of the compressor connecting hub.

According to the compressor system of the present disclosure, it is possible to improve the rotor dynamics of the rotary shaft and to increase the rotation speed of the rotary shaft.

BRIEF DESCRIPTION OF THE DRAWINGS

FIG. 3 is a cross-sectional view illustrating a configuration of a thrust force adjusting unit provided in the compressor.

DETAILED DESCRIPTION OF THE INVENTION

Hereinafter, an embodiment for carrying out the compressor system according to the present disclosure will be described with reference to the attached drawings. However, the present disclosure is not limited to this embodiment only.

(Compressor System)

Hereinafter, the compressor system according to the present embodiment will be described with reference to FIGS. 1 to 3.

Figure 1:
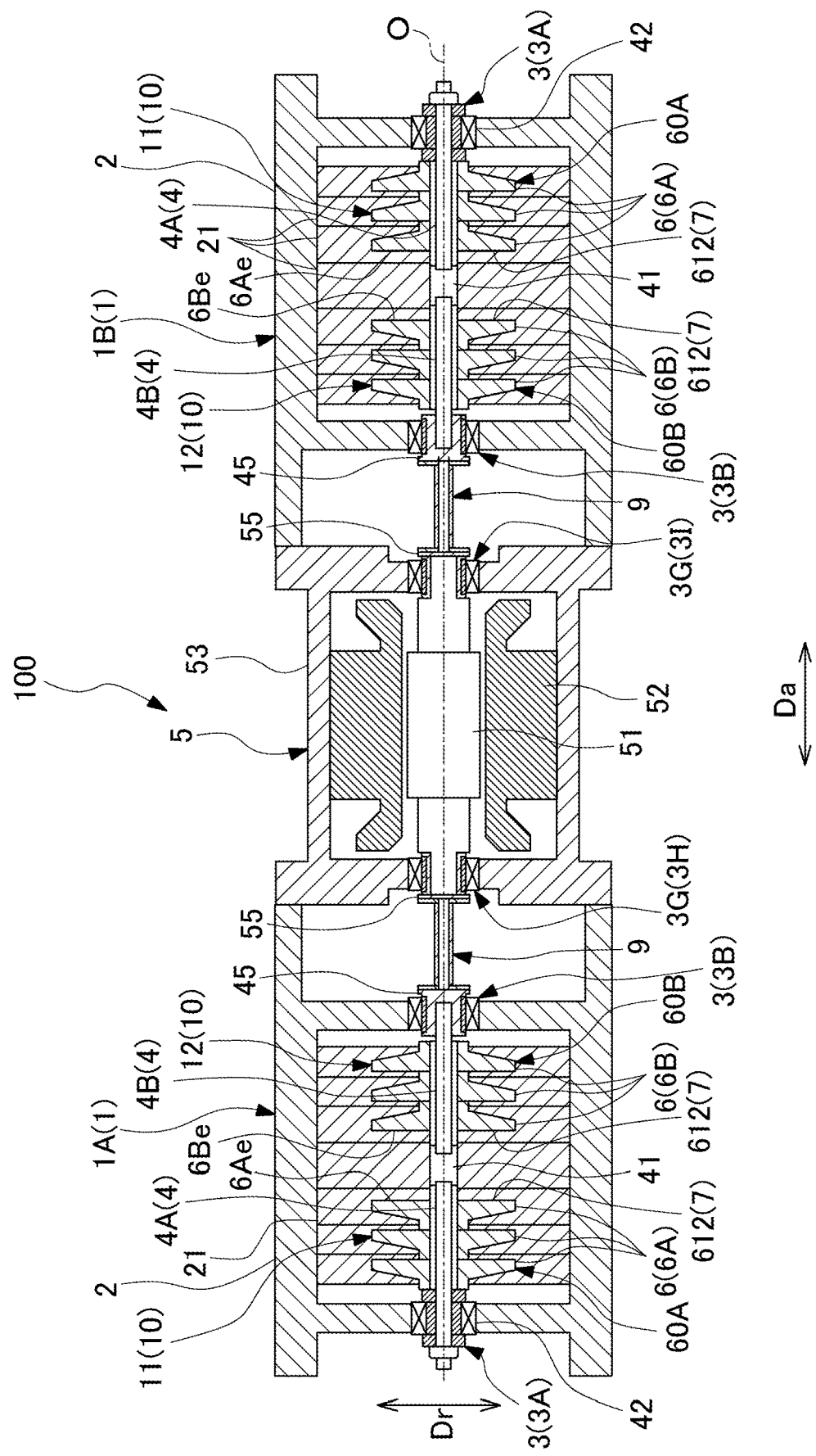
FIG. 1 is a schematic view illustrating a configuration of a compressor system according to the present embodiment.

As illustrated in FIG. 1, the compressor system 100 includes a compressor 1, a motor 5, and a coupling shaft 9. In the present embodiment, the compressor 1 is disposed on both sides of the motor 5 with the motor 5 interposed therebetween. The compressor 1 includes a low-pressure side first compressor 1A disposed on a first side (left side with respect to the motor 5 in FIG. 1) in an axial direction Da described below with the motor 5 interposed between, and a high-pressure side second compressor 1B disposed on a second side (right side with respect to the motor 5 in FIG. 2) in the axial direction Da with the motor 5 interposed between. The low-pressure side first compressor 1A compresses a working fluid (process gas) taken in from the outside and feeds the working fluid to an inlet side of the high-pressure side second compressor 1B. The working fluid compressed by the high-pressure side second compressor 1B is supplied to the process side using the working fluid.

Here, the first compressor 1A and the second compressor 1B have the same configuration except that the compressors are disposed in line symmetry with the motor 5 interposed therebetween. Thus, in the following description, the first compressor 1A will be used as an example in order to explain the configuration of the compressor 1, and the description of the second compressor 1B will be omitted.

(Configuration of Compressor)

Figure 2:
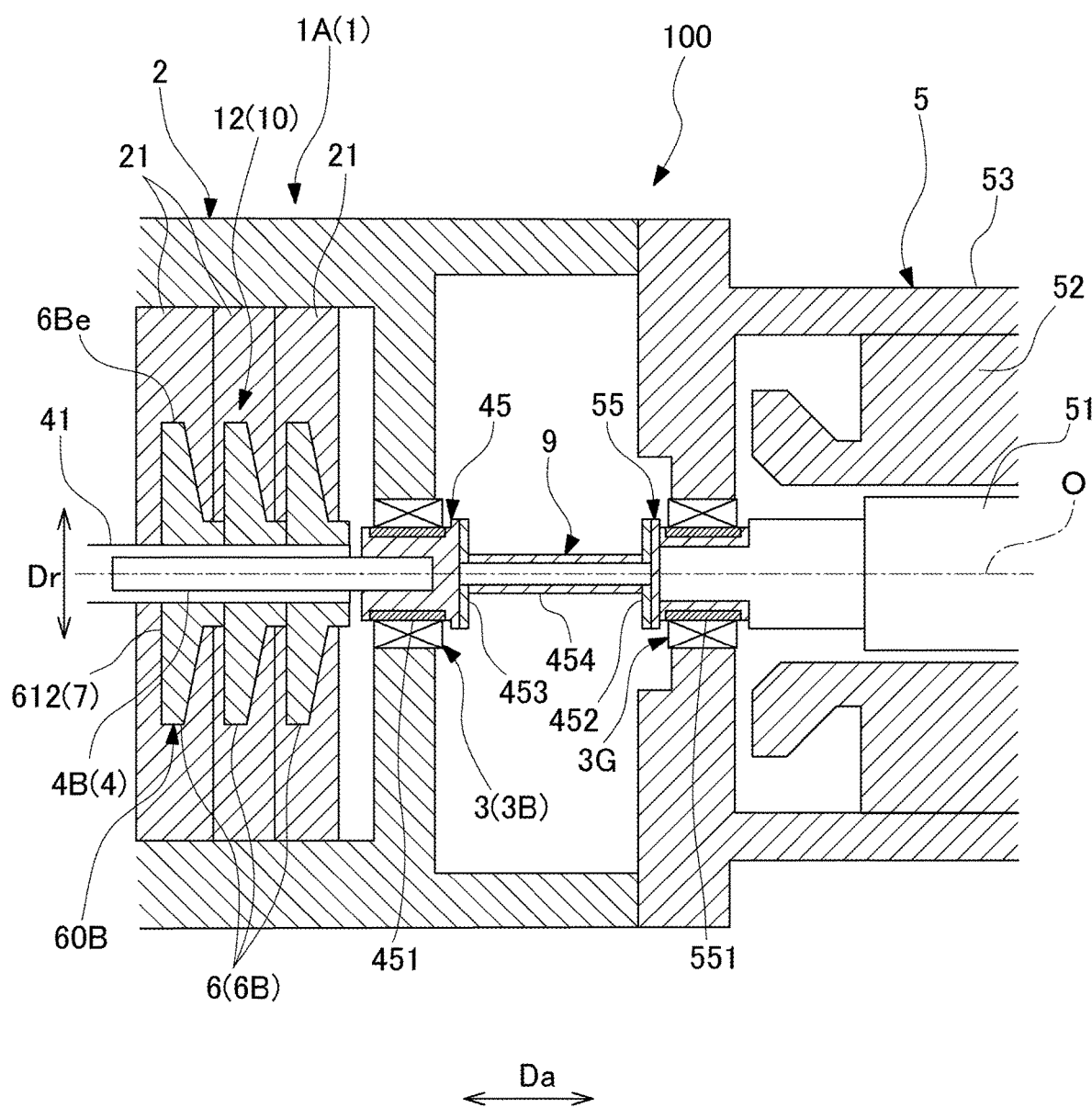
FIG. 2 is a cross-sectional view illustrating a configuration of a connecting portion between a rotary shaft of a compressor constituting the compressor system and a motor rotor.

As illustrated in FIGS. 1 and 2, the compressor 1 includes a casing 2, a diaphragm 21, a compressor bearing 3, a rotary shaft 4, an impeller 6, and a thrust force adjusting unit 7. The compressor 1 includes a pair of compression units 10. The pair of compression units 10 are a low-pressure side first compression unit 11 and a high-pressure side second compression unit 12. The low-pressure side first compression unit 11 and the high-pressure side second compression unit 12 each include three impellers 6. That is, the compressor 1 is configured as a compressor with one axis and six stages.

In such a compressor 1, the working fluid compressed by the low-pressure side first compression unit 11 flows into the high-pressure side second compression unit 12. In the process of flowing through the second compression unit 12, the working fluid is further compressed into a high-pressure working fluid.

(Configuration of Casing)

The casing 2 forms an outer shell of the compressor 1. The casing 2 has a tubular shape extending in the axial direction Da around an axis O of the rotary shaft 4. The casing 2 is formed with a suction port (not illustrated) for guiding the working fluid into the casing 2 and a discharge port (not illustrated) for discharging the working fluid from the inside of the casing 2 to the outside. The casing 2, together with the diaphragm 21, covers the compressor bearing 3, the rotary shaft 4, and the impeller 6.

(Configuration of Diaphragm)

The diaphragm 21 is housed in the casing 2. A plurality of the diaphragms 21 are disposed side by side in the axial direction Da so as to correspond to the impellers 6, respectively. The diaphragm 21 is formed in an annular shape centered on the axis O.

(Configuration of Compressor Bearing)

The compressor bearing 3 supports the rotary shaft 4 to be rotatable around the axis O. A pair of the compressor bearings 3 is disposed in the casing 2 at a distance in the axial direction Da in which the axis O extends. In the present embodiment, the compressor bearings 3 include a first bearing 3A on the first side in the axial direction Da and a second bearing 3B on the second side in the axial direction Da. In the present embodiment, the first side in the axial direction Da indicates a side farther from the motor 5, and the second side in the axial direction Da indicates a side closer to the motor 5.

The compressor bearings 3 (first bearing 3A and second bearing 3B) are held in the casing 2. Each compressor bearing 3 of the present embodiment is a gas bearing to which gas is supplied. That is, no lubricating oil is used in the compressor bearing 3. Bleed air from the working fluid boosted by the first compression unit 11 and external gas such as nitrogen are supplied to the compressor bearing 3. The compressor bearing 3 can support the rotary shaft 4 in a non-contact state by generating dynamic pressure in the gas entrained between the compressor bearing 3 and the rotating rotary shaft 4.

(Configuration of Rotary Shaft)

The rotary shaft 4 is rotatable around the axis O. The rotary shaft 4 extends in the horizontal direction. Both ends of the rotary shaft 4 are supported by the pair of compressor bearings 3. That is, the rotary shaft 4 does not protrude further to both sides (outside) in the axial direction Da than the pair of compressor bearings 3.

In the present embodiment, the rotary shaft 4 includes a first rotary shaft 4A on the first side in the axial direction Da and a second rotary shaft 4B on the second side in the axial direction Da. The first rotary shaft 4A and the second rotary shaft 4B are coupled to each other via an intermediate shaft 41 provided at a central part of the axial direction Da. The intermediate shaft 41 has a cylindrical shape extending in the axial direction Da, and inside the intermediate shaft 41, an end on of the first rotary shaft 4A on the second side in the axial direction Da and an end of the second rotary shaft 4B on the first side in the axial direction Da are coupled to each other.

As illustrated in FIG. 1, an end sleeve 42 is disposed at an end of the first rotary shaft 4A on the first side in the axial direction Da. The end sleeve 42 is formed in a cylindrical shape extending in the axial direction Da. An end of the first rotary shaft 4A on the first side in the axial direction Da is coupled to the inside of the end sleeve 42. The end sleeve 42 is disposed on the outer side in the radial direction Dr centered on the axis O with respect to the first bearing 3A disposed on the first side in the axial direction Da.

(Configuration of Connecting Hub)

As illustrated in FIGS. 1 and 2, a compressor connecting hub 45 is disposed at an end of the second rotary shaft 4B closer to the second side in the axial direction Da, that is, the motor 5. The compressor connecting hub 45 is disposed at a position where the compressor connecting hub overlaps the second bearing 3B in the axial direction Da. The compressor connecting hub 45 is fixed to the rotary shaft 4 on the inner side in the radial direction Dr with respect to the second bearing 3B disposed on the second side in the axial direction Da. That is, the second bearing 3B rotatably supports an outer peripheral surface of the compressor connecting hub 45. Therefore, the second rotary shaft 4B is indirectly supported by the second bearing 3B via the compressor connecting hub 45. The coupling shaft 9 described below is detachably connected to the compressor connecting hub 45. As illustrated in FIG. 2, the compressor connecting hub 45 is formed in a cylindrical shape extending in the axial direction Da. An end of the second rotary shaft 4B on the second side in the axial direction Da is coupled to the inside of the compressor connecting hub 45.

The surface of the compressor connecting hub 45 corresponding to an area supported by the second bearing 3B includes, for example, a hard chrome-plated surface treatment 451 in order to form a low-friction surface having a surface roughness of 1 μm or less.

(Configuration of Impeller)

The impeller 6 is fixed to the rotary shaft 4. The impeller 6 rotates integrally with the rotary shaft 4. The compressor 1 of the present embodiment includes a first impeller group 60A disposed in the first compression unit 11 and a second impeller group 60B disposed in the second compression unit 12. The first impeller group 60A and the second impeller group 60B each include, for example, three impellers 6. The impeller 6 includes a first impeller 6A disposed on the first impeller group 60A and a second impeller 6B disposed on the second impeller group 60B. Each first impeller 6A is fixed to the first rotary shaft 4A. Each second impeller 6B is fixed to the second rotary shaft 4B. Each first impeller 6A and each second impeller 6B are disposed so as to face mutually opposite sides in the axial direction Da.

As illustrated in FIG. 3, each impeller 6 is a so-called closed impeller including a disk part 61, a blade part 62, and a cover part 63 in the present embodiment.

The disk part 61 has a disk shape. For example, the disk part 61 of each first impeller 6A has an outer diameter that is gradually reduced from a back surface 612 facing one side (second side) in the axial direction Da toward a front surface 611 facing the other side (first side) in the axial direction Da. That is, the disk part 61 has a substantial umbrella shape as a whole.

Here, in the impeller 6, one side in the axial direction Da is a side where the disk part 61 is disposed with respect to the cover part 63 in the axial direction Da. Therefore, in the first impeller 6A of the present embodiment, one side in the axial direction Da is a side where the second compression unit 12 is disposed in the axial direction Da in FIG. 1. On the contrary, in the second impeller 6B of the present embodiment, one side in the axial direction Da is a side where the first compression unit 11 is disposed in the axial direction Da.

Additionally, the other side in the axial direction Da is a side where the cover part 63 is disposed with respect to the disk part 61 in the axial direction Da. Therefore, in the first impeller 6A of the present embodiment, the other side in the axial direction Da is a side where the first compression unit 11 is disposed in the axial direction Da. On the contrary, in the second impeller 6B of the present embodiment, the other side in the axial direction Da is a side where the second compression unit 12 is disposed in the axial direction Da.

That is, in the disk part 61 of the first impeller 6A, the back surface 612 faces the second compression unit 12 side in the axial direction Da. On the other hand, in the disk part 61 of the second impeller 6B, the back surface 612 faces the first compression unit 11 side in the axial direction Da. That is, the back surface 612 of the disk part 61 of the first impeller 6A and the back surface 612 of the disk part 61 of the second impeller 6B face each other in the axial direction Da.

Additionally, the disk part 61 has a substantial disk shape when viewed from the axial direction Da. A plurality of the blade parts 62 extend in the axial direction Da at a distance in the circumferential direction from the front surface 611 of the disk part 61. As illustrated in FIG. 3, a through hole 613 that penetrates the disk part 61 in the axial direction Da is formed on the inner side in the radial direction Dr centered on the axis O in the disk part 61. The rotary shaft 4 is inserted into the through hole 613.

The cover part 63 is formed so as to cover the plurality of blade parts 62. The cover part 63 has a disk shape. The cover part 63 is formed as a convex surface of which a side facing the disk part 61 faces the disk part 61 at a certain distance therefrom.

In each impeller 6, an impeller flow path 64 is formed between the disk part 61 and the cover part 63. The impeller flow path 64 includes an inflow port 6i that opens in the axial direction Da on the inner side in the radial direction Dr on the front surface 611 side of the disk part 61, and an outflow port 6o that opens toward the outer side in the radial direction Dr with respect to the impeller 6.

(Configuration of Thrust Force Adjusting Unit)

The thrust force adjusting unit 7 is disposed on each of the first impeller 6A of the first impeller group 60A and the second impeller 6B of the second impeller group 60B. In the present embodiment, the thrust force adjusting unit 7 is disposed on a final stage first impeller 6Ae located closest to the second side (a position closest to the plurality of second impellers 6B) in the axial direction Da among the first impellers 6A of the first impeller group 60A. In the present embodiment, the thrust force adjusting unit 7 is disposed on a final stage second impeller 6Be located closest to the first side (a position closest to the final stage first impeller 6Ae) in the axial direction Da among the second impellers 6B of the second impeller group 60B.

The final stage first impeller 6Ae and the final stage second impeller 6Be are formed with a protruding part 65 that protrudes from the back surface 612 and is formed integrally with the disk part 61. In the present embodiment, the protruding part 65 has an outer protruding part 66 and an inner protruding part 67. The outer protruding part 66 protrudes from the back surface 612 in the axial direction Da. The outer protruding part 66 of the present embodiment annularly protrudes from the back surface 612 of the disk part 61 so as to surround the through hole 613 of the disk part 61. The outer protruding part 66 has an outer sealing surface 661 and an outer pressure-receiving surface 662.

The outer sealing surface 661 is formed parallel to an outer surface of the rotary shaft 4. The outer sealing surface 661 is a smooth surface of the outer protruding part 66 facing the outer side in the radial direction Dr. In the present embodiment, the amount of protrusion of the outer protruding part 66 from the back surface 612 is determined by the width of the outer sealing surface 661 in the axial direction Da. The outer sealing surface 661 is formed at a position separated from the outer surface of the rotary shaft 4 by a predetermined distance. Specifically, the predetermined distance of the present embodiment is a value preset for each compressor 1. The predetermined distance is determined depending on the magnitude of a force received by the outer pressure-receiving surface 662 in order to balance the thrust force acting on the rotary shaft 4.

The outer pressure-receiving surface 662 of the outer protruding part 66 faces a direction including the axial direction Da. That is, the outer pressure-receiving surface 662 receives a force acting in the axial direction Da. Here, the direction including the axial direction Da intersects the axis O, excludes a direction orthogonal to the axial direction Da, and includes a direction inclined from or parallel to the axis O. The outer pressure-receiving surface 662 is preferably formed so as to have as large an area as possible. The outer pressure-receiving surface 662 has an outer inclined pressure-receiving surface 662a and an outer vertical pressure-receiving surface 662b.

The outer inclined pressure-receiving surface 662a is an inclined surface inclined with respect to the axis O. The outer inclined pressure-receiving surface 662a of the present embodiment faces one side in the axial direction Da and the inner side in the radial direction Dr. That is, the outer inclined pressure-receiving surface 662a is inclined so as to face the second compression unit 12 side in the axial direction Da and the outer surface side of the rotary shaft 4. The outer inclined pressure-receiving surface 662a extends from an end of the outer sealing surface 661 in the axial direction Da toward the outer vertical pressure-receiving surface 662b.

The outer vertical pressure-receiving surface 662b is a surface extending vertically from an end of the outer inclined pressure-receiving surface 662a on the inner side in the radial direction Dr to the inner side in the radial direction Dr. The outer vertical pressure-receiving surface 662b is a surface orthogonal to the outer surface of the rotary shaft 4 and faces one side in the axial direction Da. The outer vertical pressure-receiving surface 662b of the present embodiment faces the second compression unit 12 side in the axial direction Da, similar to the back surface 612.

The inner protruding part 67 protrudes from the back surface 612 in the axial direction Da. The inner protruding part 67 is provided on the inner side in the radial direction Dr with respect to the outer protruding part 66. The inner protruding part 67 of the present embodiment annularly protrudes from the back surface 612 of the disk part 61 so as to surround the through hole 613 of the disk part 61. The inner protruding part 67 has an inner sealing surface 671 and an inner pressure-receiving surface 672.

The inner sealing surface 671 is formed parallel to the outer surface of the rotary shaft 4. The inner sealing surface 671 is a smooth surface of the inner protruding part 67 facing the outer side in the radial direction Dr. The inner sealing surface 671 is formed on the inner side in the radial direction Dr with respect to the outer sealing surface 661. The inner sealing surface 671 of the present embodiment is connected to an end of the outer vertical pressure-receiving surface 662b on the inner side in the radial direction Dr. In the present embodiment, the amount of protrusion of the inner protruding part 67 from the outer vertical pressure-receiving surface 662b is determined by the width of the inner sealing surface 671 in the axial direction Da. The inner sealing surface 671 is formed at a position separated from the outer surface of the rotary shaft 4 by a predetermined distance. Specifically, the predetermined distance of the present embodiment is a value preset for each compressor 1. The predetermined distance is determined depending on the magnitude of a force received by the inner pressure-receiving surface 672 in order to balance the thrust force acting on the rotary shaft 4.

The inner pressure-receiving surface 672 is a surface of the inner protruding part 67 facing a direction including the axial direction Da. That is, the inner pressure-receiving surface 672 is a surface that receives a force acting in the axial direction Da. The inner pressure-receiving surface 672 is preferably formed so as to have as large an area as possible. The inner pressure-receiving surface 672 has an inner inclined pressure-receiving surface 672a and an inner vertical pressure-receiving surface 672b.

The inner inclined pressure-receiving surface 672a is an inclined surface inclined with respect to the axis O. The inner inclined pressure-receiving surface 672a of the present embodiment faces one side in the axial direction Da and the inner side in the radial direction Dr. That is, the inner inclined pressure-receiving surface 672a is inclined so as to face the second compression unit 12 side in the axial direction Da and the outer surface side of the rotary shaft 4. The inner inclined pressure-receiving surface 672a extends from an end of the inner sealing surface 671 in the axial direction Da toward the inner vertical pressure-receiving surface 672b.

The inner vertical pressure-receiving surface 672b is a surface extending vertically from the end of the inner inclined pressure-receiving surface 672a on the inner side in the radial direction Dr to an end of the through hole 613 toward the inner side in the radial direction Dr. That is, the inner vertical pressure-receiving surface 672b is a surface orthogonal to the outer surface of the rotary shaft 4 and faces one side in the axial direction Da. The inner vertical pressure-receiving surface 672b is formed at the same position as the outer vertical pressure-receiving surface 662b in the axial direction Da. The inner vertical pressure-receiving surface 672b of the present embodiment faces the second compression unit 12 side in the axial direction Da, similar to the back surface 612.

The thrust force adjusting unit 7 adjusts the thrust force in the axial direction Da between the back surface 612 of the disk part 61 and the diaphragm 21 disposed inside the casing 2. The thrust force adjusting unit 7 has an outer sealing part 71, an inner sealing part 72, and a constriction forming part 73.

The outer sealing part 71 seals the area between the back surface 612 and the diaphragm 21. The outer sealing part 71 of the present embodiment seals a gap in the radial direction Dr between the outer sealing surface 661 and the diaphragm 21. The outer sealing part 71 is fixed to the diaphragm 21. The outer sealing part 71 is a labyrinth seal in which a minute gap is formed between the outer sealing part 71 and the outer sealing surface 661.

The inner sealing part 72 is disposed at a position separated from the outer sealing part 71 to the inner side in the radial direction Dr. The inner sealing part 72 seals between the back surface 612 and the diaphragm 21. The inner sealing part 72 of the present embodiment seals a gap in the radial direction Dr between the inner sealing surface 671 and the diaphragm 21. The inner sealing part 72 is fixed to the diaphragm 21. The inner sealing part 72 is a labyrinth seal in which a minute gap is formed between the inner sealing part 72 and the inner sealing surface 671.

The constriction forming part 73 forms a constriction part S3 in which the spacing between the back surface 612 and the diaphragm 21 in the axial direction Da is narrowed. The constriction forming part 73 is provided integrally with the diaphragm 21 so as to face the back surface 612. The constriction forming part 73 has a projecting part 731 that protrudes toward the back surface 612. The projecting part 731 has a projecting part inclined surface 731a that inclines so as to be used for the outer surface of the rotary shaft 4 as approaching the back surface 612. The constriction part S3 is formed between a tip of the projecting part 731 and the back surface 612. The constriction part S3 is formed at a position separated from the inner sealing part 72 to the inner side in the radial direction Dr. The width of the constriction part S3 in the axial direction Da is narrower than the widths of an outer space S1 and an inner space S2 in the axial direction Da, which will be described below. That is, the spacing between the back surface 612 and the diaphragm 21 is formed to be the narrowest in the constriction part S3. Specifically, the constriction part S3 is formed between the inner vertical pressure-receiving surface 672b and the tip of the projecting part 731. The constriction part S3 is a so-called "self-made constriction" in which the spacing from the back surface 612 changes as the first impeller 6A moves.

The outer space S1 is formed between the back surface 612 and the diaphragm 21 by the outer sealing part 71 and the inner sealing part 72. The outer space S1 is a space that is sandwiched between the outer sealing part 71 and the inner sealing part 72 and extends in the radial direction Dr. The outer space S1 is preferably formed such that the width thereof in the axial direction Da is as small as possible within a range in which the back surface 612 and the diaphragm 21 do not come into contact with each other. The outer space S1 of the present embodiment is formed so as to face the outer inclined pressure-receiving surface 662a and the outer vertical pressure-receiving surface 662b. A gas such as a working fluid slightly leaking from the vicinity of the outflow port 6o of the impeller 6 of the first compression unit 11 through the outer sealing part 71 and a gas supplied from an external gas introduction part 83 described below flows into the outer space S1.

The inner space S2 is formed between the back surface 612 and the diaphragm 21 by the inner sealing part 72 and the projecting part 731. The inner space S2 is a space that is sandwiched between the inner sealing part 72 and the constriction part S3 and extends in the radial direction Dr. That is, the inner space S2 is formed on the inner side in the radial direction Dr with respect to the outer space S1. The inner space S2 is a space continuous with the constriction part S3. The inner space S2 is preferably formed such that the width thereof in the axial direction Da is as small as possible within a range in which the back surface 612 and the diaphragm 21 do not come into contact with each other. The inner space S2 is preferably formed with a volume corresponding to the outer space S1. Here, the corresponding volume is a volume that can be regarded as substantially the same. The inner space S2 of the present embodiment is formed so as to face the inner inclined pressure-receiving surface 672a and the inner vertical pressure-receiving surface 672b. The gas in the outer space S1 slightly leaks from the inner sealing part 72 and flows into the inner space S2.

The external gas introduction part 83 introduces a gas, which increases the pressure in the outer space S1, from the outside into the outer space S1. The external gas introduction part 83 is a gas supply line that allows an external gas supply source and the outer space S1 to communicate with each other. The gas compressed by the external gas introduction part 83 is supplied to the outer space S1, using a booster pump, which is provided outside, as a gas supply source. The external gas introduction part 83 opens to the diaphragm 21 facing the outer space S1 between the outer sealing part 71 and the inner sealing part 72. The external gas introduction part 83 supplies a gas having a pressure closer to that of the working fluid compressed during steady operation.

In such a thrust force adjusting unit 7, part of the working fluid compressed by the first impeller 6A flows from the vicinity of the outflow port 6o toward the outer sealing part 71. The working fluid, which has flowed to the outer sealing part 71, slightly leaks into the outer space S1 along the outer sealing surface 661. The working fluid leaking into the outer space S1 flows through the outer space S1 toward the inner sealing part 72. The working fluid, which has flowed to the inner sealing part 72, slightly leaks into the inner space S2 along the inner sealing surface 671. The working fluid leaking into the inner space S2 flows through the inner space S2 toward the constriction part S3. Since the width of the constriction part S3 in the axial direction Da is narrower than the width of the inner space S2 in the axial direction Da, the working fluid flows out from the inner space S2 while being decompressed when passing through the constriction part S3. The working fluid flowing out into the diaphragm 21 through the constriction part S3 is discharged to the outside of the casing 2 from the discharge port (not illustrated).

In the compressor 1, the working fluid is compressed by the first compression unit 11 and the second compression unit 12, and thereby the thrust force acting on the rotary shaft 4 is generated in the axial direction Da to which the impeller 6 is fixed via the disk part 61. When, for example, a thrust force from the first compression unit 11 side toward the second compression unit 12 side in the axial direction Da is generated on the rotary shaft 4 due to the thrust force, the reception of the thrust force allows and the first impeller 6A to move to the second compression unit 12 side in the axial direction Da together with the rotary shaft 4. As a result, the first impeller 6A moves to the second compression unit 12 side in the axial direction Da, and the spacing of the constriction parts S3 is narrowed. By narrowing the spacing of the constriction parts S3, the amount of leakage of the working fluid from the inner space S2 decreases, and the pressures in the outer space S1 and the inner space S2 rises. Accordingly, the outer inclined pressure-receiving surface 662a and the outer vertical pressure-receiving surface 662b that define the outer space S1 and parts of the inner inclined pressure-receiving surface 672a and the inner vertical pressure-receiving surface 672b that define the inner space S2 are pushed toward the first compression unit 11 in the axial direction Da. As a result, the first impeller 6A is pushed back in a direction in which the spacing of the constriction parts S3 increases.

On the contrary, for example, when a thrust force from the second compression unit 12 side toward the first compression unit 11 side in the axial direction Da is generated in the rotary shaft 4, the reception of the thrust force allows the first impeller 6A to move to the first compression unit 11 side in the axial direction Da together with the rotary shaft 4. As a result, the first impeller 6A moves toward the first compression unit 11 side in the axial direction Da, and the spacing of the constriction parts S3 increases. By increasing the spacing of the constriction parts S3, the amount of leakage of the working fluid from the inner space S2 increases, and the pressures in the outer space S1 and the inner space S2 decrease. Accordingly, the outer inclined pressure-receiving surface 662a and the outer vertical pressure-receiving surface 662b that define the outer space S1 and parts of the inner inclined pressure-receiving surface 672a and the inner vertical pressure-receiving surface 672b that define the inner space S2 are pulled toward the second compression unit 12 side in the axial direction Da. As a result, the first impeller 6A is pushed back in a direction in which the spacing of the constriction parts S3 is narrowed. Therefore, even if the thrust force acting on the rotary shaft 4 fluctuates and the rotary shaft 4 moves in the axial direction Da, the rotary shaft 4 can be automatically restored (returned) to its original position by moving the first impeller 6A.

(Configuration Pf Motor)

As illustrated in FIG. 1, the motor 5 is disposed between the first compressor 1A and the second compressor 1B in the axial direction Da. The motor 5 has a motor casing 53, a motor rotor 51, a motor bearing 3G, and a stator 52.

The motor casing 53 forms an outer shell of the motor 5. The motor casing 53 is formed in a tubular shape extending in the axial direction Da. An end of the motor casing 53 in the axial direction Da is coupled to the casing 2 of the compressor 1. The motor casing 53 covers the motor rotor 51 and the stator 52.

The motor rotor 51 is provided coaxially with the rotary shaft 4. The motor rotor 51 is made rotatable around the axis O by a pair of the motor bearings 3G provided in the motor casing 53. Both ends of the motor rotor 51 are supported by the pair of motor bearings 3G. That is, the motor rotor 51 does not protrude further to both sides in the axial direction Da than the pair of motor bearings 3G. The motor rotor 51 is coupled to the rotary shaft 4 via the coupling shaft 9 described below. The motor rotor 51 rotates integrally with the rotary shaft 4 together with the coupling shaft 9.

Each motor bearing 3G supports the motor rotor 51 to be rotatable around the axis O. The pair of motor bearings 3G is disposed at a distance in the axial direction Da in the motor casing 53. In the present embodiment, the motor bearings 3G include a third bearing 3H on the first side in the axial direction Da and a fourth bearing 3I on the second side in the axial direction Da. In the motor 5, the first side in the axial direction Da is a side closer to the first compressor 1A, and the second side in the axial direction Da is a side closer to the second compressor 1B.

The motor bearings 3G (third bearing 3H and fourth bearing 3I) are held in the motor casing 53. Each motor bearing 3G is a gas bearing similar to the compressor bearing 3. That is, no lubricating oil is used in the motor bearing 3G.

The stator 52 is disposed on the outer side in the radial direction Dr with respect to the motor rotor 51. The stator 52 is fixed to the motor casing 53. In such a motor 5, when a coil provided in the stator 52 is energized, the motor rotor 51 rotates with respect to the stator 52. Accordingly, the motor 5 transmits a rotational driving force to the rotary shaft 4 to rotate the rotary shaft 4 of the first compressor 1A and the second compressor 1B.

Motor connecting hubs 55 are disposed at both ends of the motor rotor 51. As illustrated in FIG. 2, each motor connecting hub 55 is disposed at a position where the motor connecting hub overlaps each motor bearing 3G in the axial direction Da. The motor connecting hub 55 is fixed to the rotary shaft 4 on the inner side in the radial direction Dr with respect to the motor bearing 3G. That is, the motor bearing 3G rotatably supports an outer peripheral surface of the motor connecting hub 55. Therefore, the motor rotor 51 is indirectly supported by the motor bearing 3G via the motor connecting hub 55. The coupling shaft 9 described below is detachably connected to the motor connecting hub 55. The motor connecting hub 55 is formed in a cylindrical shape extending in the axial direction Da. An end of the motor rotor 51 is coupled to the inside of the motor connecting hub 55.

The surface of the motor connecting hub 55 corresponding to an area supported by the motor bearing 3G includes, for example, a hard chrome-plated surface treatment 551 in order to form a low-friction surface having a surface roughness of 1 µm or less.

(Configuration of Coupling Shaft)

The coupling shaft 9 couples the motor rotor 51 to the rotary shaft 4 such that the rotation of the motor rotor 51 is transmittable to the rotary shaft 4. The coupling shaft 9 is provided coaxially with the motor rotor 51 and the rotary shaft 4. The coupling shaft 9 rotates together with the rotary shaft 4 as the motor rotor 51 rotates. The coupling shaft 9 is connected to the compressor connecting hub 45 and the motor connecting hub 55. That is, the coupling shaft 9 indirectly connects the rotary shaft 4 to the motor rotor 51 via the compressor connecting hub 45 and the motor connecting hub 55.

The coupling shaft 9 makes it possible to alleviate the misalignment between the second rotary shaft 4B and the motor rotor 51. That is, while the coupling shaft 9 transmits a rotational torque between the second rotary shaft 4B and the motor rotor 51, deformation of part of the coupling shaft 9 makes it possible to absorb misalignment such as displacement in the axial direction Da, axial misalignment, and angular displacement.

In addition, as the coupling shaft 9, the compressor connecting hub 45, and the motor connecting hub 55, for example, flexible couplings or diaphragm couplings can be used.

Specifically, the coupling shaft 9 integrally includes a tubular part 454, a first flange 452 that is a low-stiffness member, and a second flange 453 that is similarly a low-stiffness member.

The tubular part 454 extends in the axial direction Da. The tubular part 454 has a cylindrical shape centered on the axis O. The first flange 452 is connected to an end of the tubular part 454 on the first side (the side closer to the compressor 1) in the axial direction Da. The first flange 452 spreads from the tubular part 454 toward the outer side in the radial direction Dr. Specifically, the first flange 452 is formed in an annular shape that is continuous around the axis O. The first flange 452 is detachably connected to the compressor connecting hub 45 with bolts or the like. The second flange 453 is connected to an end of the tubular part 454 on the second side (the side closer to the motor 5) in the axial direction Da. The second flange 453 spreads from the tubular part 454 toward the outer side in the radial direction Dr. The second flange 453 is formed in an annular shape that is continuous around the axis O so as to have the same shape as the first flange 452. The second flange 453 is detachably connected to the motor connecting hub 55 with bolts or the like. The first flange 452 and the second flange 453 are formed so as to have lower stiffness than the compressor connecting hub 45 and the tubular part 454.

(Operational Effects)

In the compressor system 100 having the above configuration, the compressor connecting hub 45 is disposed at a position where the compressor connecting hub 45 overlaps the compressor bearing 3 in the axial direction Da and on the inner side in the radial direction Dr and is connected to the coupling shaft 9. Accordingly, in a case where a relative displacement of the coupling shaft 9 has occurred between the coupling shaft 9 and the compressor connecting hub 45 to which the rotary shaft 4 is fixed due to thermal elongation of the rotary shaft 4 and the motor rotor 51, the first flange 452 and the second flange 453 are elastically deformed depending on the relative displacement. In this way, the coupling shaft 9 alleviates misalignment with the compressor connecting hub 45. That is, the coupling shaft 9 indirectly alleviates the misalignment with the rotary shaft 4 via the compressor connecting hub 45. Moreover, it is possible to suppress that a heavy object such as the compressor connecting hub 45 is disposed on the outer side in the axial direction Da with respect to the compressor bearing 3 of the compressor 1. Therefore, it is possible to improve the rotor dynamics of the rotary shaft 4 and increase the rotation speed of the rotary shaft 4.

Additionally, the motor connecting hub 55 is provided at the end of the motor rotor 51. The motor connecting hub 55 is disposed at a position where the motor connecting hub 55 overlaps the motor bearing 3G in the axial direction Da and at a position on the inner side in the radial direction Dr. Accordingly, in a case where a relative displacement of the coupling shaft 9 has occurred between the coupling shaft 9 and the motor connecting hub 55 to which the motor rotor 51 is fixed due to thermal elongation of the rotary shaft 4 and the motor rotor 51, the first flange 452 and the second flange 453 are elastically deformed depending on the relative displacement. In this way, the coupling shaft 9 alleviates misalignment with the motor connecting hub 55. That is, the coupling shaft 9 indirectly alleviates the misalignment with the motor rotor 51 via the motor connecting hub 55. Moreover, it is possible to suppress a heavy object such as the motor connecting hub 55 is disposed on the outer side in the axial direction Da with respect to the motor bearing 3G. Therefore, it is possible to improve the rotor dynamics of the motor rotor 51 and increase the rotation speed of the motor rotor 51. As a result, the rotor dynamics of the rotary shaft 4 that rotates integrally with the motor rotor 51 can be further improved, and the rotation speed of the rotary shaft 4 can be further increased.

Additionally, the coupling shaft 9 includes the hollow tubular part 454, and the first flange 452 and the second flange 453 integrally formed with the tubular part 454. The tubular part 454 can make the stiffness of the coupling shaft 9 lower than that of the rotary shaft 4 of the compressor 1 and the motor rotor 51. Accordingly, the rotary shaft 4 of the compressor 1 and the motor rotor 51 of the motor 5 are not rigidly coupled, and the coupling shaft 9 disposed between the rotary shaft 4 and the motor rotor 51 can be elastically deformed mainly in the radial direction Dr. Accordingly, the misalignment between the rotary shaft 4 and the motor rotor 51 is alleviated by the coupling shaft 9. As a result, the rotary shaft 4 of the compressor 1 and the motor rotor 51 of the motor 5 can be independently handled in terms of vibration characteristics. Therefore, it is possible to further improve the rotor dynamics of the rotary shaft 4 and increase the rotation speed of the rotary shaft 4.

Additionally, the thrust force adjusting unit 7 that adjusts the thrust force in the axial direction Da is disposed between the back surface 612 of the disk part 61 facing one side in the axial direction Da and the casing 2. Accordingly, part of the working fluid compressed by the impeller 6 flows into the outer space S1 through the outer sealing part 71. The working fluid, which has flowed into the outer space S1, flows into the inner space S2 through the inner sealing part 72. Moreover, the inflowing working fluid in the inner space S2 flows to the constriction part S3. Since the width of the constriction part S3 in the axial direction Da is narrower than the width of the inner space S2 in the axial direction Da, the working fluid flows out from the inner space S2 while being decompressed when passing through the constriction part S3. In this state, when the impeller 6 receives a thrust force together with the rotary shaft 4 and moves in the axial direction Da to narrow the spacing of the constriction parts S3, the amount of leakage from the inner space S2 decreases, and the pressures in the outer space S1 and the inner space S2 rises. As a result, the impeller 6 is pushed back in a direction in which the spacing of the constriction parts S3 increases. On the contrary, when the spacing of the constriction part S3 increases due to the movement of the impeller 6, the amount of leakage from the inner space S2 increases, and the pressures in the outer space S1 and the inner space S2 decrease. As a result, the impeller 6 is pushed back in the direction in which the spacing of the constriction part S3 is narrowed. By moving the impeller 6 in this way, even if the thrust force acting on the rotary shaft 4 fluctuates and the rotary shaft 4 moves in the axial direction Da, the rotary shaft 4 can be automatically restored (returned) to its original position. Moreover, since it is not necessary to install a thrust bearing or a balance piston for supporting the thrust force, the length of the rotary shaft 4 in the axial direction Da can be suppressed. As a result, the rotor dynamics of the rotary shaft 4 can be further improved.

Additionally, the thrust force adjusting unit 7 is provided in each of the first impeller 6A provided on the first side in the axial direction Da and having the back surface 612 directed to the second side in the axial direction Da and the second impeller 6B provided on the second side in the axial direction Da and having the back surface 612 directed to the first side in the axial direction Da. Accordingly, the position of the rotary shaft 4 is adjusted from both sides in the axial direction Da. Therefore, even if the thrust force acting on the rotary shaft 4 fluctuates and the rotary shaft 4 moves in the axial direction Da, the rotary shaft 4 can be automatically and rapidly restored to its original position.

Additionally, the thrust force adjusting units 7 are disposed on the final stage first impeller 6Ae located closest to the second side (most downstream) in the axial direction Da and the final stage second impeller 6Be located closest to the first side (most downstream) in the axial direction Da with respect to the plurality of first impellers 6A and second impellers 6B facing mutually opposite sides in the axial direction Da. For that reason, the two thrust force adjusting units 7 are disposed at the closest positions in the axial direction Da. Accordingly, the two thrust force adjusting units 7 are less likely to be affected by the thermal elongation in the axial direction Da generated on the rotary shaft 4. As a result, it is possible to suppress that the spacing of the constriction parts S3 is narrowed due to the influence of thermal elongation generated on the rotary shaft 4.

Additionally, gas bearings are used as the compressor bearing 3 and the motor bearing 3G. That is, all the bearings that support the rotary shaft 4 and the motor rotor 51 are made of the gas bearings. Accordingly, the frictional resistance generated during the rotation of the rotary shaft 4 can be suppressed as compared to bearings using lubricating oil, and it is possible to effectively contribute to an increase in the rotation speed of the rotary shaft 4. Additionally, the frictional resistance can be further suppressed by subjecting the surfaces of the compressor connecting hub 45 and the motor connecting hub 55 to the hard chrome-plated surface treatment. In addition, in a case where a bearing and the rotary shaft come into contact with each other and the rotary shaft side is damaged, it is only necessary to replace the damaged compressor connecting hub 45 or the motor connecting hub 55, and as long as a spare part of the compressor connecting hub 45 or the motor connecting hub 55 is provided, the rotary shaft can be restored at low cost and at an early stage. Additionally, by including both the thrust force adjusting unit 7 and the gas bearing, it is not necessary to use lubricating oil for the bearing supporting the rotary shaft 4, and the compressor system 100 in which the amount of lubricating oil used is suppressed can be obtained.

OTHER EMBODIMENTS

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In addition, in the above embodiment, each of the first compressor 1A and the second compressor 1B includes the six-stage impeller 6. However, the number of stages is not limited at all. Additionally, in each of the first compressor 1A and the second compressor 1B, the directions of the first impeller 6A and the second impeller 6B are made different in the first impeller group 60A and the second impeller group 60B but the directions are not limited to this. The directions of the impellers 6 may be aligned with each other in the first impeller group 60A and the second impeller group 60B.

Additionally, in the above embodiment, the first compressor 1A and the second compressor 1B are provided on both sides of the motor 5. However, the present invention is not limited to this. For example, the compressor 1 may be provided only on one side of the motor 5.

In addition, in the above embodiment, the surface of the compressor connecting hub 45 corresponding to the area supported by the second bearing 3B and the surface of the motor connecting hub 55 corresponding to the area supported by the motor bearing 3G includes the hard chrome-plated surface treatment 451 in order to form low-friction surfaces having a surface roughness of 1 µm or less. However, the surface treatment applied to the surface of the compressor connecting hub 45 and the surface of the motor connecting hub 55 is not limited to this. The surface of the compressor connecting hub 45 and the surface of the motor connecting hub 55 may be, for example, any hard surface treatment such as diamond-like coating.

APPENDIXES

The compressor system 100 described in the embodiment is grasped as follows, for example.

(1) A compressor system 100 according to a first aspect may include a compressor 1 having a rotary shaft 4 that is configured to rotate around an axis O, an impeller 6 that is configured to with the rotary shaft 4, and a casing 2 that covers the rotary shaft 4 and the impeller 6; a motor 5 that includes a motor rotor 51 disposed coaxially with the rotary shaft 4 and a stator 52 disposed outside the motor rotor 51 in a radial direction Dr and is configured to rotationally drive the rotary shaft 4; and a coupling shaft 9 that couples the motor rotor 51 to the rotary shaft 4 such that the rotation of the motor rotor 51 is transmittable to the rotary shaft 4, the compressor 1 includes a compressor bearing 3 that supports the rotary shaft 4 to be rotatable around the axis o, and a compressor connecting hub 45 that is fixed to the rotary shaft 4 at a position where the compressor connecting hub 45 overlaps the compressor bearing 3 in an axial direction Da in which the axis O extends and at a position on an inner side in the radial direction Dr, the coupling shaft 9 being detachably connected to the compressor connecting hub 45, the coupling shaft 9 is allowed to alleviate misalignment with the compressor connecting hub 45, and the compressor bearing 3 rotatably supports an outer peripheral surface of the compressor connecting hub 45.

Examples of the compressor connecting hub 45 and the coupling shaft 9 include a flexible coupling and a diaphragm coupling.

In the compressor system 100, in a case where a relative displacement of the coupling shaft 9 has occurred between the coupling shaft 9 and the compressor connecting hub 45 to which the rotary shaft 4 is fixed due to thermal elongation of the rotary shaft 4 and the motor rotor 51, the misalignment with the compressor connecting hub 45 is alleviated. That is, the coupling shaft 9 indirectly alleviates the misalignment with the rotary shaft 4 via the compressor connecting hub 45. Moreover, it is possible to suppress that a heavy object such as the compressor connecting hub 45 is disposed on the outer side in the axial direction Da with respect to the compressor bearing 3 of the compressor 1. Therefore, it is possible to improve the rotor dynamics of the rotary shaft 4 and increase the rotation speed of the rotary shaft 4.

(2) The compressor system 100 according to a second aspect may be the compressor system 100 of (1) in which a surface of the compressor connecting hub 45 corresponding to an area supported by the compressor bearing 3 is provided with a hard surface treatment.

By having the hard surface treatment on the surface of the compressor connecting hub 45, the frictional resistance can be further suppressed.

(3) The compressor system 100 according to a third aspect may be the compressor system 100 of (1) or (2) in which the motor 5 includes a motor bearing 3G that supports the motor rotor 51 to be rotatable around the axis O, and a motor connecting hub 55 that is fixed to the motor rotor 51 at a position where the motor connecting hub 55 overlaps the motor bearing 3G in the axial direction Da and at a position on the inner side in the radial direction Dr, the coupling shaft 9 being detachably connected to the motor connecting hub 55, the coupling shaft 9 is allowed to alleviate misalignment with the motor connecting hub 55, and the motor bearing 3G may rotatably support an outer peripheral surface of the motor connecting hub 55.

In a case where a relative displacement of the coupling shaft 9 has occurred between the coupling shaft 9 and the motor connecting hub 55 to which the motor rotor 51 is fixed due to the thermal elongation of the rotary shaft 4 or the motor rotor 51, the misalignment with the motor connecting hub 55 is alleviated. That is, the coupling shaft 9 indirectly alleviates the misalignment with the motor rotor 51 via the motor connecting hub 55. Moreover, it is possible to suppress a heavy object such as the motor connecting hub 55 is disposed on the outer side in the axial direction Da with respect to the motor bearing 3G. Therefore, it is possible to improve the rotor dynamics of the motor rotor 51 and increase the rotation speed of the motor rotor 51. As a result, the rotor dynamics of the rotary shaft 4 that rotates integrally with the motor rotor 51 can be further improved, and the rotation speed of the rotary shaft 4 can be further increased.

(4) The compressor system 100 according to a fourth aspect may be the compressor system 100 of (3) in which a surface of the motor connecting hub 55 corresponding to an area supported by the motor bearing 3G is provided with a hard surface treatment.

By having the hard surface treatment on the surface of the motor connecting hub 55, the frictional resistance can be further suppressed.

(5) The compressor system 100 according to a fifth aspect may be the compressor system 100 according to any one of (1) to (4) in which the coupling shaft 9 includes a tubular part 454 that extends in the axial direction Da and formed in hollow and a first flange 452 that is connected to an end of the tubular part 454 closer to the compressor 1 in the axial direction Da and is detachably connected to the compressor connecting hub 45, and the first flange 452 may have a lower stiffness than the tubular part 454.

The tubular part 454 and the first flange 452 can make the stiffness of the coupling shaft 9 lower than that of the rotary shaft 4 and the motor rotor 51. Accordingly, the rotary shaft 4 and the motor rotor 51 are not rigidly coupled, and the coupling shaft 9 disposed between the rotary shaft 4 and the motor rotor 51 can be elastically deformed mainly in the radial direction Dr. Accordingly, the misalignment between the rotary shaft 4 and the motor rotor 51 is alleviated by the coupling shaft 9. As a result, the rotary shaft 4 and the motor rotor 51 can be independently handled in terms of vibration characteristics. Therefore, it is possible to further improve the rotor dynamics of the rotary shaft 4 and increase the rotation speed of the rotary shaft 4.

(6) The compressor system 100 according to a sixth aspect may be the compressor system 100 according to any one of (1) to (5) may further include a thrust force adjusting unit 7 that is configured to adjust a thrust force in the axial direction Da between a back surface 612 of a disk part 61 of the impeller 6 facing one side in the axial direction Da and the casing 2, the thrust force adjusting unit 7 may include an outer sealing part 71 that seals between the back surface 612 and the casing 2, an inner sealing part 72 that is disposed at a position separated from the outer sealing part 71 to the inner side in the radial direction Dr and seals between the back surface 612 and the casing 2, and a constriction forming part 73 that forms a constriction part S3 in which a spacing between the back surface 612 and the casing 2 in the axial direction Da is narrowed at a position separated from the inner sealing part 72 to the inner side in the radial direction Dr, and an outer space S1 sandwiched between the outer sealing part 71 and the inner sealing part 72 and an inner space S2 sandwiched between the inner sealing part 72 and the constriction part S3 may be formed between the back surface 612 and the casing 2, and a width of the constriction part S3 in the axial direction Da may be narrower than a width of the inner space S2 in the axial direction Da.

Accordingly, part of the working fluid compressed by the impeller 6 flows into the outer space S1 through the outer sealing part 71. The working fluid, which has flowed into the outer space S1, flows into the inner space S2 through the inner sealing part 72. Moreover, the inflowing working fluid in the inner space S2 flows to the constriction part S3. Since the width of the constriction part S3 in the axial direction Da is narrower than the width of the inner space S2 in the axial direction Da, the working fluid flows out from the inner space S2 while being decompressed when passing through the constriction part S3. In this state, when the impeller 6 receives a thrust force together with the rotary shaft 4 and moves in the axial direction Da to narrow the spacing of the constriction parts S3, the amount of leakage from the inner space S2 decreases, and the pressures in the outer space S1 and the inner space S2 rises. As a result, the impeller 6 is pushed back in a direction in which the spacing of the constriction parts S3 increases. On the contrary, when the spacing of the constriction part S3 increases due to the movement of the impeller 6, the amount of leakage from the inner space S2 increases, and the pressures in the outer space S1 and the inner space S2 decrease. As a result, the impeller 6 is pushed back in the direction in which the spacing of the constriction part S3 is narrowed. By moving the impeller 6 in this way, even if the thrust force acting on the rotary shaft 4 fluctuates and the rotary shaft 4 moves in the axial direction Da, the rotary shaft 4 can be automatically restored (returned) to its original position. Moreover, since it is not necessary to install a thrust bearing or a balance piston for supporting the thrust force, the length of the rotary shaft 4 in the axial direction Da can be suppressed. As a result, the rotor dynamics of the rotary shaft 4 can be further improved.

(7) The compressor system 100 according to a seventh aspect may be the compressor system 100 of (6) in which the impeller 6 has at least one first impeller 6A and at least one second impeller 6B that is disposed to face a side opposite to the at least one first impeller 6A in the axial direction Da and is configured to compress a working fluid compressed by the at least one first impeller 6A, and the thrust force adjusting units 7 are provided on both the at least one first impeller 6A and the at least one second impeller 6B.

Accordingly, the position of the rotary shaft 4 is adjusted from both sides in the axial direction Da. Therefore, even if the thrust force acting on the rotary shaft 4 fluctuates and the rotary shaft 4 moves in the axial direction Da, the rotary shaft 4 can be automatically and rapidly restored to its original position.

(8) The compressor system 100 according to an eighth aspect may be the compressor system 100 of (7) in which the at least one first impeller 6A has a plurality of first impellers 6A disposed in the axial direction Da and the at least one second impellers 6B has s a plurality of second impellers 6B disposed in the axial direction Da, and the thrust force adjusting unit 7 may be disposed on a final stage first impeller 6Ae disposed at a position closest to the plurality of second impellers 6B in the axial direction Da among the plurality of first impellers 6A and a final stage second impeller 6Be disposed at a position closest to the final stage first impeller 6Ae in the axial direction Da among the plurality of second impellers 6B.

Accordingly, the thrust force adjusting unit 7 disposed on the final stage first impeller 6Ae and the thrust force adjusting unit 7 disposed on the final stage second impeller 6Be are disposed close to each other in the axial direction Da. For that reason, the two thrust force adjusting units 7 are disposed at the closest positions in the axial direction Da. Accordingly, the two thrust force adjusting units 7 are less likely to be affected by the thermal elongation in the axial direction Da generated on the rotary shaft 4. As a result, it is possible to suppress that the spacing of the constriction parts S3 is narrowed due to the influence of thermal elongation generated on the rotary shaft 4.

(9) The compressor system 100 according to a ninth aspect may be the compressor system 100 according to any one of (1) to (8) in which bearings supporting the rotary shaft 4 and the motor rotor 51 may be all gas bearings.

Accordingly, by using a gas bearing as the bearing, the frictional resistance generated during the rotation of the rotary shaft 4 can be suppressed as compared to the bearing using lubricating oil, and it is possible to effectively contribute to an increase in the rotation speed of the rotary shaft 4. Additionally, by including both the thrust force adjusting unit 7 and the gas bearing, the amount of lubricating oil used for lubricating the rotary shaft 4 can be suppressed.

EXPLANATION OF REFERENCES

1: compressor
1A: first compressor
1B: second compressor
2: casing
3: compressor bearing
3A: first bearing
3B: second bearing
3G: motor bearing
4: rotary shaft
4A: first rotary shaft
4B: second rotary shaft
5: motor
6: impeller
6A: first impeller
6Ae: final stage first impeller
6B: second impeller
6Be: final stage second impeller
6i: inflow port
6o: outflow port
7: thrust force adjusting unit
9: coupling shaft
10: compression unit
11: first compression unit
12: second compression unit
21: diaphragm
41: intermediate shaft
42: end sleeve
45: compressor connecting hub
51: motor rotor
52: stator
53: motor casing
55: motor connecting hub
60A: first impeller group
60B: second impeller group
61: disk part
62: blade part
63: cover part
64: impeller flow path
65: protruding part
66: outer protruding part
67: inner protruding part
71: outer sealing part
72: inner sealing part
73: constriction forming part
83: external gas introduction part
100: compressor system
451, 551: hard chrome-plated surface treatment
452: first flange
453: second flange
454: tubular part
611: front surface
612: back surface
613: through hole
661: outer sealing surface
662: outer pressure-receiving surface
662a: outer inclined pressure-receiving surface
662b: outer vertical pressure-receiving surface
671: inner sealing surface
672: inner pressure-receiving surface
672a: inner inclined pressure-receiving surface
672b: inner vertical pressure-receiving surface
731: projecting part
731a: projecting part inclined surface
Da: axial direction
Dr: radial direction
O: axis
S1: outer space
S2: inner space
S3: constriction part

What is claimed is:
1. A compressor system comprising:
a compressor including a rotary shaft that is configured to rotate around an axis, at least one impeller that is configured to rotate with the rotary shaft, and a casing that covers the rotary shaft and the at least one impeller;

a motor that includes a motor rotor disposed coaxially with the rotary shaft and a stator disposed outside the motor rotor in a radial direction and is configured to rotationally drive the rotary shaft; and a coupling shaft that couples the motor rotor to the rotary shaft such that a rotation of the motor rotor is transmittable to the rotary shaft, wherein the compressor includes
- a compressor bearing that supports the rotary shaft to be rotatable around the axis, and
- a compressor connecting hub that is fixed to the rotary shaft at a position where the compressor connecting hub overlaps the compressor bearing in an axial direction in which the axis extends and at a position on an inner side in the radial direction, the coupling shaft being detachably connected to the compressor connecting hub, the coupling shaft is allowed to alleviate misalignment with the compressor connecting hub, and the compressor bearing rotatably supports an outer peripheral surface of the compressor connecting hub, the compressor system further comprises a thrust force adjusting unit that is configured to adjust a thrust force in the axial direction between a back surface of a disk part of the at least one impeller facing one side in the axial direction and the casing, the thrust force adjusting unit includes
- an outer sealing part that seals a space between the back surface and the casing,
- an inner sealing part that is disposed at a position separated from the outer sealing part to the inner side in the radial direction and seals the space between the back surface and the casing, and
- a constriction forming part that forms a constriction part in which the space between the back surface and the casing in the axial direction is narrowed at a position separated from the inner sealing part to the inner side in the radial direction, an outer space sandwiched between the outer sealing part and the inner sealing part and an inner space sandwiched between the inner sealing part and the constriction part are formed between the back surface and the casing, and a width of the constriction part in the axial direction is narrower than a width of the inner space in the axial direction.

2. The compressor system according to claim 1, wherein a surface of the compressor connecting hub corresponding to an area supported by the compressor bearing is provided with a hard surface treatment.

3. The compressor system according to claim 1, wherein the motor includes
- a motor bearing that supports the motor rotor to be rotatable around the axis, and
- a motor connecting hub that is fixed to the motor rotor at a position where the motor connecting hub overlaps the motor bearing in the axial direction and at a position on the inner side in the radial direction, the coupling shaft being detachably connected to the motor connecting hub, the coupling shaft is allowed to alleviate misalignment with the motor connecting hub, and the motor bearing rotatably supports an outer peripheral surface of the motor connecting hub.

4. The compressor system according to claim 3, wherein a surface of the motor connecting hub corresponding to an area supported by the motor bearing is provided with a hard surface treatment.

5. The compressor system according to claim 1, wherein the coupling shaft includes
- a tubular part that extends in the axial direction and formed in hollow and
- a first flange that is connected to an end of the tubular part closer to the compressor in the axial direction and is detachably connected to the compressor connecting hub, and the first flange has a lower stiffness than the tubular part.

6. The compressor system according to claim 1, wherein the at least one impeller includes at least one first impeller and at least one second impeller that is disposed to face a side opposite to the at least one first impeller in the axial direction and is configured to compress a working fluid compressed by the at least one first impeller, and each of the at least one first impeller and the at least one second impeller is provided with the thrust force adjusting unit.

7. The compressor system according to claim 6, wherein the at least one first impeller comprises a plurality of first impellers disposed in the axial direction and the at least one second impeller includes a plurality of second impellers disposed in the axial direction, the first impellers include a final stage first impeller disposed at a position closest to the plurality of second impellers in the axial direction, and the second impellers include a final stage second impeller disposed at a position closest to the final stage first impeller in the axial direction and each of the final stage first impeller and the final stage second impeller is provided with the thrust force adjusting unit.

8. The compressor system according to claim 1, wherein the compressor bearing is a gas bearing.

9. The compressor system according to claim 3, wherein the motor bearing is a gas bearing.

* * * * *